March 26, 1940. J. S. KAMBORIAN 2,194,598
MACHINE FOR USE IN THE MANUFACTURE OF SHOES
Filed April 13, 1938 5 Sheets-Sheet 1

INVENTOR
Jacob S. Kamborian
By his Attorney
Victor Cobb

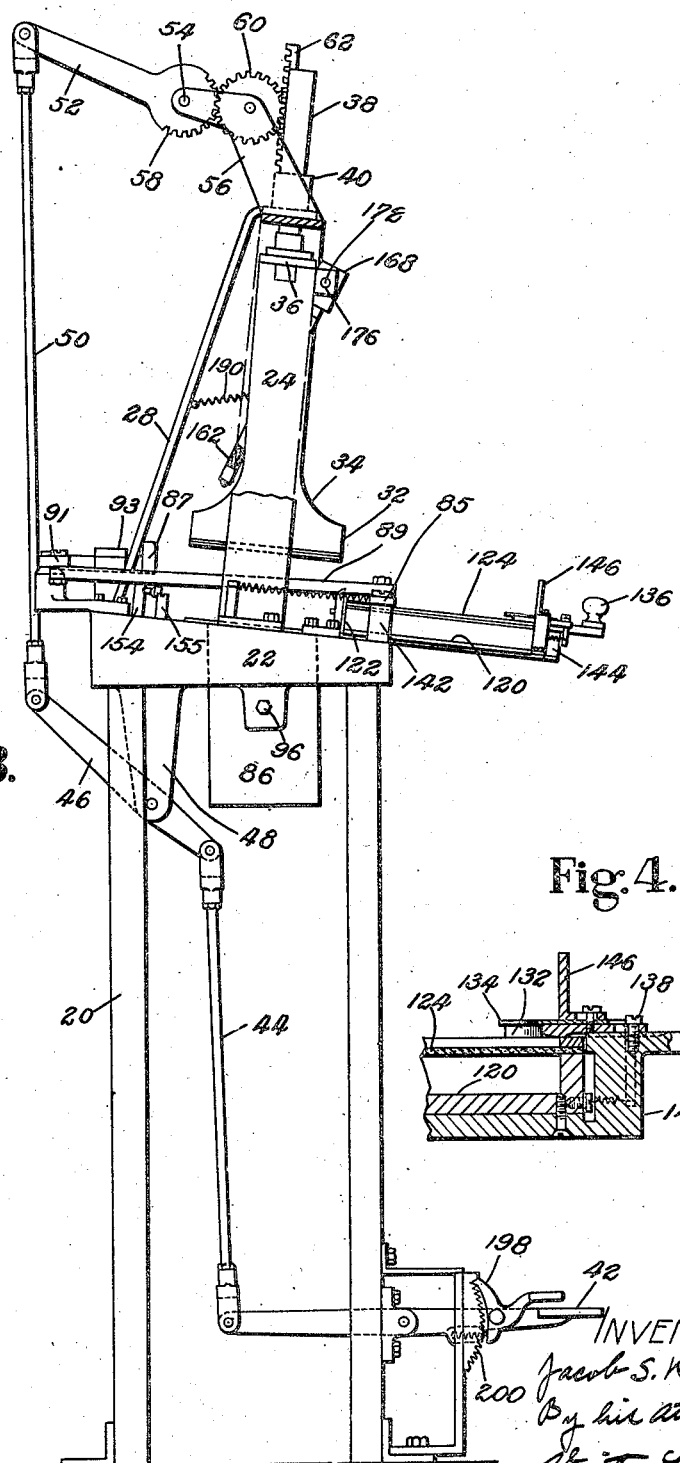

March 26, 1940.  J. S. KAMBORIAN  2,194,598
MACHINE FOR USE IN THE MANUFACTURE OF SHOES
Filed April 13, 1938  5 Sheets-Sheet 3

INVENTOR
Jacob S. Kamborian
By his Attorney
Victor Colt

March 26, 1940. J. S. KAMBORIAN 2,194,598
MACHINE FOR USE IN THE MANUFACTURE OF SHOES
Filed April 13, 1938 5 Sheets-Sheet 4
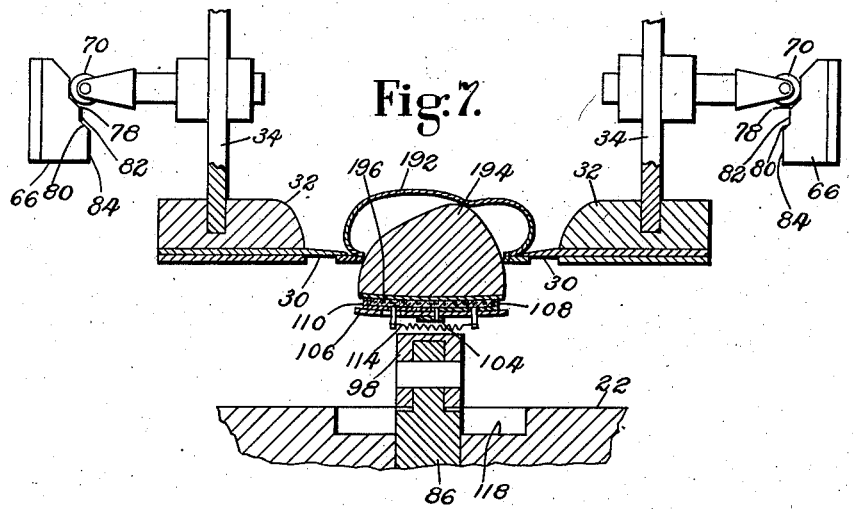
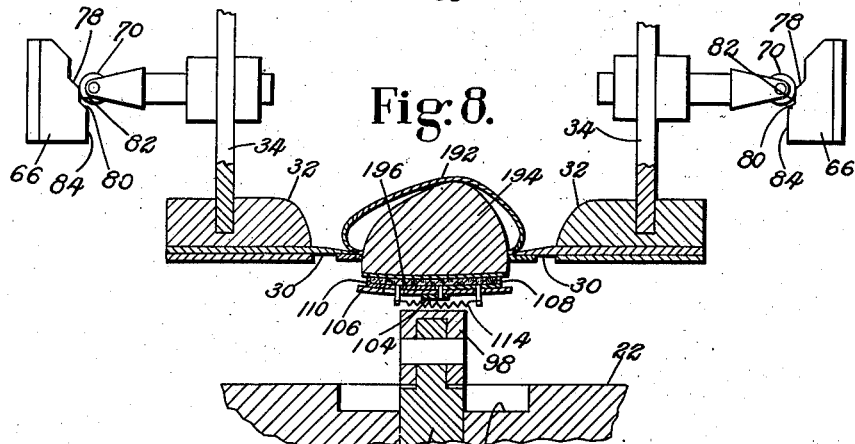
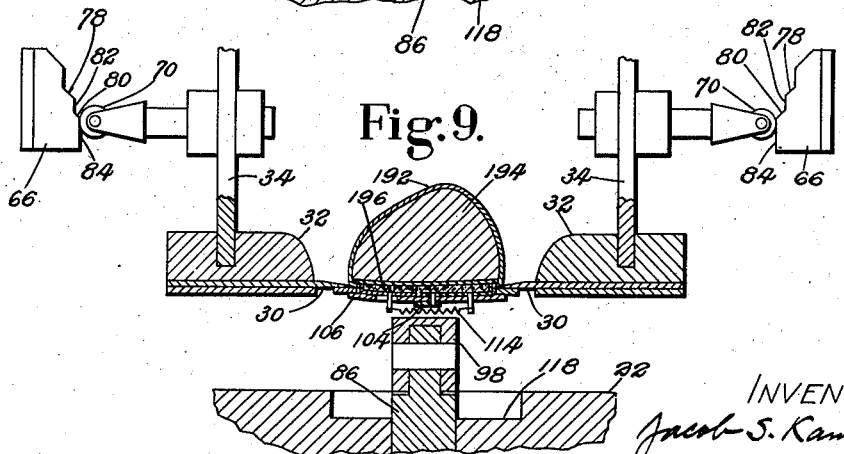
INVENTOR
Jacob S. Kamborian
By his Attorney
Victor Cobb March 26, 1940.  J. S. KAMBORIAN  2,194,598
MACHINE FOR USE IN THE MANUFACTURE OF SHOES
Filed April 13, 1938  5 Sheets-Sheet 5
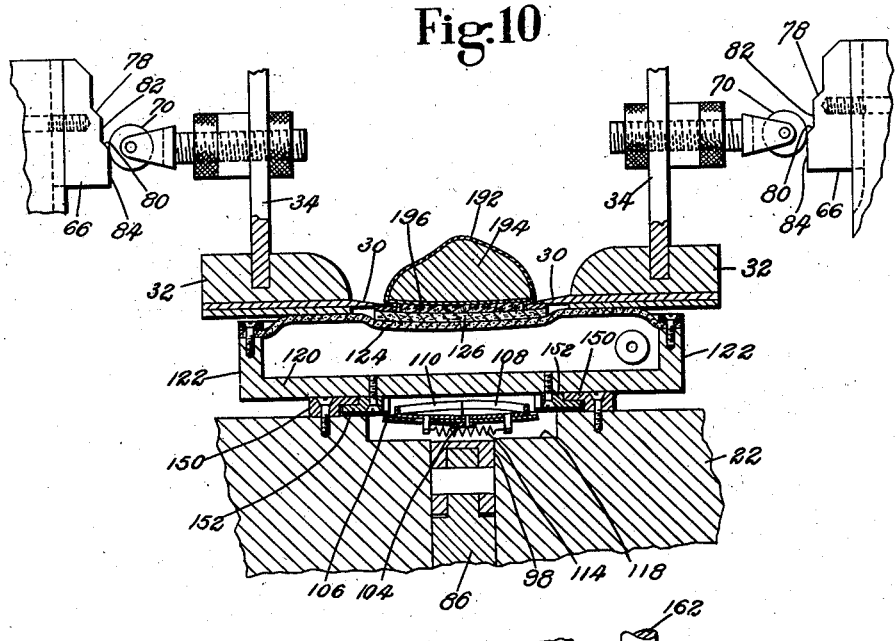
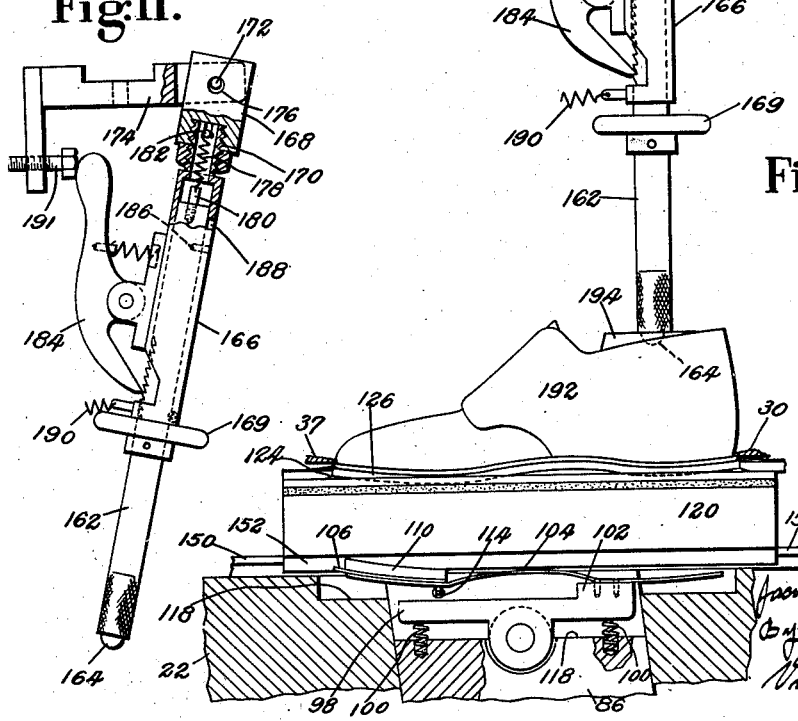
INVENTOR
Joseph S. Kamborian
By his Attorney
Victor Cobb Patented Mar. 26, 1940

2,194,598

UNITED STATES PATENT OFFICE 2,194,598

MACHINE FOR USE IN THE MANUFACTURE OF SHOES

Jacob S. Kamborian, Newton, Mass., assignor to United Shoe Machinery Corporation, Borough of Flemington, N. J., a corporation of New Jersey Application April 13, 1938, Serial No. 201,785

39 Claims. (Cl. 12—7)

This invention relates to machines for use in the manufacture of shoes and is herein illustrated in its application to machines for stretching and shaping prewelted uppers over lasts and thereafter attaching soles thereto.

The term "shoe" has been employed in the specification and claims in referring to an upper on its last which may or may not have been lasted and to which an outsole may or may not have been applied and is to be construed in accordance with this intent where the context so requires.

It is an object of the present invention to provide in a machine having devices for stretching and shaping uppers over lasts and attaching soles thereto an improved organization adapted to perform the several operations on the shoe with a minimum of attention on the part of the operator but without any sacrifice in the quality of the work as compared with other machines or methods for performing similar work in the manufacture of shoes.

With the above object in view, the invention in one aspect thereof consists in the provision in a machine for use in the manufacture of shoes of means for stretching and shaping an upper over a last in upright position by operative movement heightwise of the last, means for holding the last against heightwise movement in the direction of the stretching action on the upper, and a member for supporting a sole and positioning it for attachment to the upper after the upper has been stretched and shaped over the last. For stretching and shaping an upper over a last, side-lasting wipers are provided and means is provided for moving the wipers heightwise of the last toward the last bottom. During the heightwise movement of the wipers the wipers are automatically advanced into upper-engaging position. In the illustrated machine the advance of the wipers occurs in two stages at predetermined intervals during the heightwise movement of the wipers. During the first stage of the advancement of the wipers they are brought into engagement with the upper in the region of the welt crease and during the last stage of the advancement of the wipers the welted margin of the upper is lasted to an insole on the last bottom. The means for holding the last against heightwise movement during the stretching of the upper and the member for supporting a sole for attachment to the upper occupy the same position with relation to the upper at different stages in the operation of the machine and, in accordance with a further feature of the invention, each of these parts is movable from its operative position to permit advancement of the other into operative position. In accordance with still another feature of the invention, the member which supports and positions a sole for attachment to the upper is operated by inflation, to press a sole against the bottom of a lasted shoe in the machine, and is movable relatively to the shoe from a position in which it is out of alinement with the shoe heightwise thereof to an operative position beneath the shoe. For positioning the sole in predetermined relation to the inflatable member means herein illustrated as gage plates are provided.

Other features of the invention relate to an organization of lasting wipers comprising wipers constructed and arranged to last the sides and one end portion of a prewelted upper, carriers to which said wipers are secured, and a pair of lasting wipers for lasting the opposite end portion of the upper, which wipers are pivoted to the wiper carriers at opposite sides of a shoe in the machine. In the machine herein illustrated the wiper assembly comprises a pair of wipers for lasting the sides and the rear portion of a prewelted upper, which wipers are constructed and arranged for substantially rectilinear operating movement generally widthwise of the upper, and a pair of toe wipers constructed and arranged for swinging operating movement about axes adjacent to the opposite sides of the toe end of the upper. The illustrated toe-lasting wipers are pivoted to the wiper carriers above referred to and move with the carriers generally widthwise of the shoe to last the opposite sides of the toe portion of the upper, and means is provided for swinging the toe wipers in a direction to last the end of the toe portion of the upper.

Still other features of the invention relate to the combination with lasting wipers, of means for supporting an insole and holding it against the bottom of a last in an upper, and wiper-operating mechanism constructed and arranged to position the upper and the last to register accurately with the insole. In the illustrated machine the insole support also supports the last by its bottom during the lasting operation and the lasting mechanism positions the last to register accurately with the supported insole without the aid of last-penetrating fastenings, thus obviating the damage to lasts caused by repeated driving of fastenings into them.

These and other features of the invention will now be described with reference to the accompanying drawings and will be pointed out in the appended claims.

In the drawings,

Fig. 3 is a side elevation of the machine;

Fig. 4 is a detail view of part of the sole-laying device illustrated in Fig. 3 and is partly in section on the line IV—IV of Fig. 5;

Figure 1:
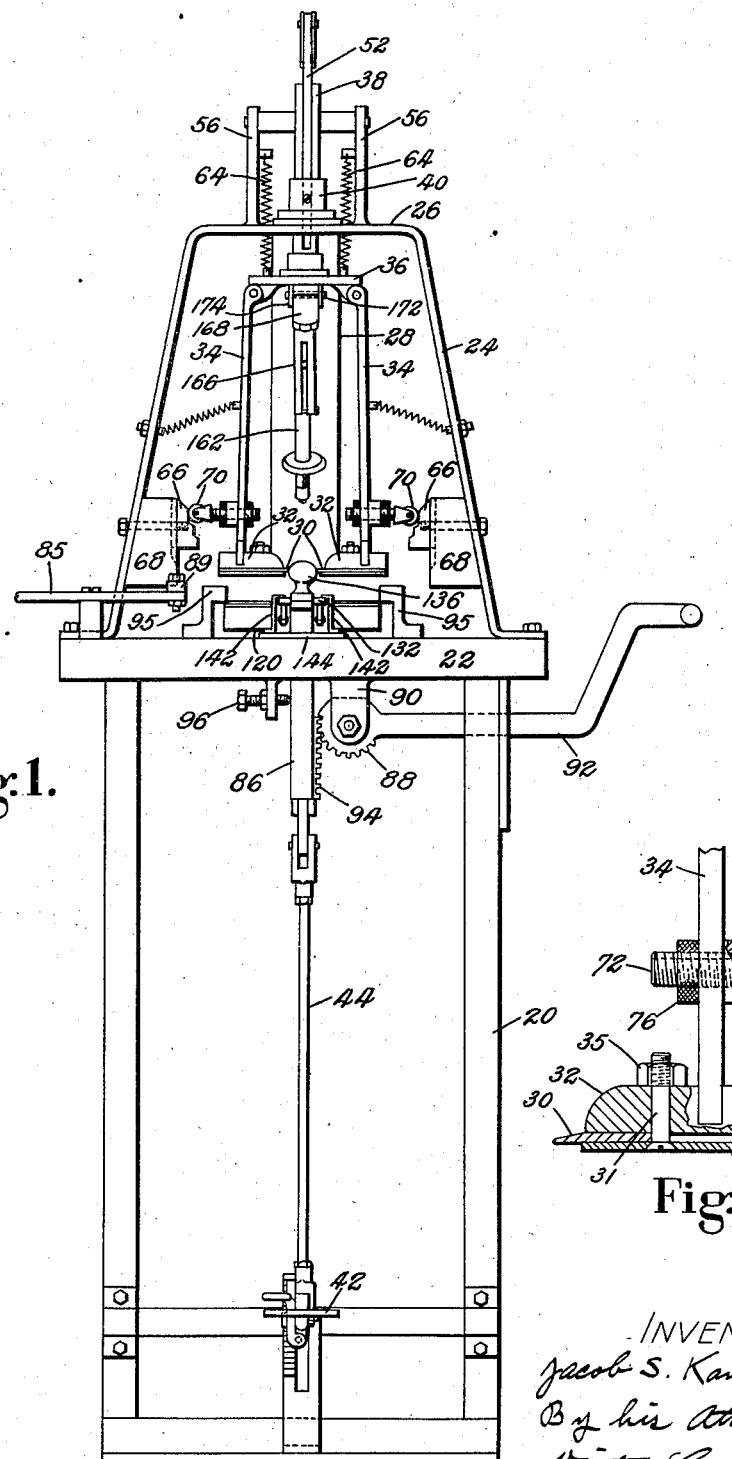
Fig. 1 is a front elevation of a machine embodying my invention.

Figs. 7 to 10, inclusive, are front elevations, partly in section, illustrating the lasting and work-supporting mechanism at different stages in the operation of the machine, the sole-laying device being shown in Fig. 10 in operating position;

Fig. 11 is a detail view illustrating a last holddown member; and

Fig. 12 is a detail view showing part of the last holddown member in engagement with a last in the machine and showing also the sole-laying device in its operative position.

The illustrated machine is constructed and arranged to operate on a shoe in upright position. For supporting a last during the lasting operation the machine is provided with a member which provides a rest for a last in upright position. The last is free to move widthwise and lengthwise on its support and is positioned on the support by lasting wipers in the course of the lasting operation. The last support also serves as a means for holding an insole having a filler attached thereto against the last bottom, and is provided with devices for positioning the insole and filler unit in predetermined relation to a shoe in the machine. The illustrated lasting wiper assembly includes side-lasting wipers which, as they advance, position the last to register accurately with an insole and filler unit on the last support. Thus the insole is positioned for the lasting operation without tacking it to the last bottom. The last support is so constructed that it does not interfere with the lasting of the welted margin of an upper on the last up to the edge face of the filler on the insole. The illustrated lasting wipers not only last the welted margin to the insole but also operate to stretch the upper over the last by movement heightwise of the last toward the last bottom. To that end said wipers are mounted on wiper carriers which move downwardly toward the last bottom after they have been advanced into the welt crease. This downward movement of the wipers continues until they are low enough to permit them to move in under the margin of the insole. For lasting the toe portion of the welted margin to the insole the illustrated machine is provided with a pair of toe-lasting wipers which are pivoted at opposite sides of the toe portion of the shoe to the wiper carriers and are arranged to swing toward and from the toe end of the shoe. The toe-lasting wipers operate in conjunction with the side-lasting wipers above referred to to stretch the toe portion of the upper over the last by movement heightwise of the last toward the last bottom preliminary to the lasting of the welted margin to the insole. After the lasting operation has been completed the upper and the last, together with the insole and filler unit, are all supported in a predetermined position by the lasting wipers. At this time the last support which is slidably mounted for heightwise movement in the machine table is moved downwardly to position it below the top of the machine table. Thereupon a sole-laying device which is initially in a remote position in front of the last support is moved on ways in the machine table to position it beneath the supported shoe. This sole-laying device is provided with locating means for so positioning a sole thereon that the sole will register accurately with the bottom of the shoe in the machine when the sole-laying device is advanced to position it beneath the shoe. The illustrated sole-laying device includes a sole-supporting member which is operated by fluid pressure, preferably compressed air, to press the sole against the shoe bottom to cement the sole to the welt and the filler.

Figure 2:
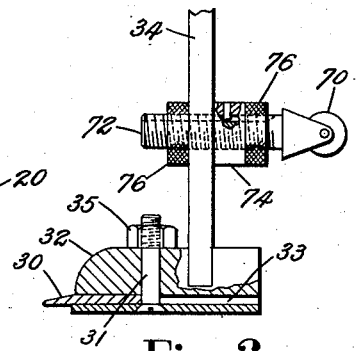
Fig. 2 is a detail view of one of the lasting wiper assemblies illustrated in Fig. 1 and is partly shown in section on the line II—II of Fig. 5.
Figures 5, 6:
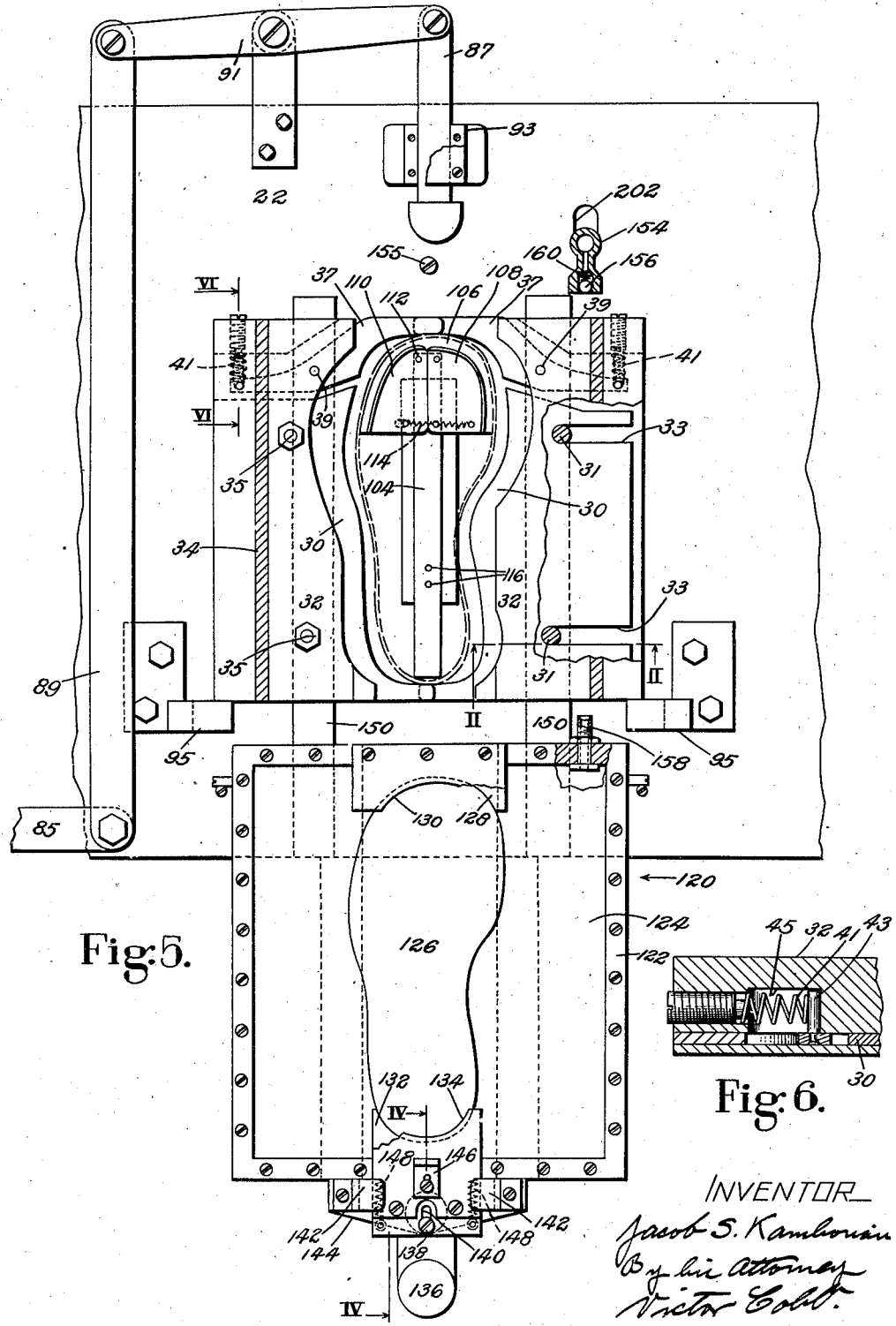
Fig. 5 is a plan view illustrating the lasting and sole-laying mechanism, certain parts being broken away to show underlying parts.
Fig. 6 is a sectional view taken on the line VI—VI of Fig. 5.

Referring now to Fig. 1, the illustrated machine comprises a standard 20 having at its upper end a table 22 to which there is secured a frame comprising a plate 24 having a crosshead 26 at its upper end to which is secured another frame plate 28 extending downwardly and rearwardly to the back of the machine table. Referring now to Fig. 3, the upper surface of the machine table 22 inclines downwardly toward the front of the machine in order that the operating parts will be arranged in the most convenient position for the operator and the frame plate 24 inclines forwardly toward the front of the machine, being positioned substantially at right angles to the top of the table. The frame members 24 and 28 support the lasting mechanism, the general organization of which is illustrated in Fig. 1. The illustrated lasting mechanism comprises a pair of wiper plates for lasting the sides and the rear part of a prewelted upper and another pair of wiper plates for lasting the toe portion of the upper. The side wiper plates are indicated at 30. Said wiper plates are mounted on carriers or blocks 32 (Fig. 2) which are secured to the lower ends of arms or pendants 34 which swing toward or from each other to move the wiper carriers generally widthwise of a shoe in the machine. To facilitate the removal of the side-lasting wipers 30 from the carriers 32 and the substitution therefore of another pair of wipers of a different size or style, the wipers are secured to their carriers by clamping bolts 31 (Figs. 2 and 5) which extend upwardly through the wiper carriers 32 and through open end slots 33 provided in the wipers. When it is desired to remove the side wipers the operator has only to loosen the clamping nuts 35 to permit the wipers to be removed from their carriers. Referring to Fig. 5, the toe-lasting wipers 37 comprise a pair of plates which overlap at a point adjacent to the widthwise center of the toe portion of a shoe in the machine and are pivoted at 39 to the wiper carriers. The toe wiper plates are yieldingly held in their retracted position illustrated in Fig. 5 by springs 41, one of which is illustrated in Fig. 6, which engage pins 43 projecting upwardly from the outer ends of the toe wipers and into grooves 45 provided in the wiper carriers. It will be understood that the retracted position of the toe wipers is determined by the engagement of the pins 43 with the end walls of the grooves 45, in which position they are yieldingly held by the springs 41. The pendants 34 are pivoted at their upper ends to a crosshead 36 (Fig. 1) secured to the lower end of a sliding shaft 38 which is splined in a bearing 40 on the frame member 28. The side-lasting wipers derive their operative movement from a downward movement of the sliding shaft 38 which is effected by depressing a treadle 42 (Fig. 3) which is connected by a link 44 to a rocker arm 46 pivoted to an arm 48 extending downwardly from the machine table. The rocker arm 46 is connected by a link 50 to an arm 52 which is mounted on a shaft 54 which is journaled in uprights 56 (Fig. 1) extending upwardly from the crosshead 26 of the frame members 24. The arm 52 has a gear segment 58 formed therein and arranged to mesh with a gear 60 which, in turn, meshes with a rack 62 secured to the sliding shaft 38. It will be seen that when the operator steps on the treadle 42 the arm 52 is swung in a direction to move the sliding shaft 38 downwardly. For returning the sliding shaft to its initial position two vertical springs 64 (Fig. 1) are attached to the crosshead 36 and arranged to extend upwardly through openings in the crosshead 26 to pins extending inwardly from the uprights 56. During the downward movement of the wiper assembly the wipers are automatically moved toward each other widthwise of a shoe in the machine first to advance the lasting wipers into the welt crease of the upper and to hold the welted margin of the upper against the periphery of the last while the upper is stretched and shaped over the last and finally, after the wipers have moved downwardly below the plane of the last bottom, to advance the wipers further to last the welted margin of the upper to the margin of an insole on the last bottom. As illustrated in Fig. 1, the mechanism for automatically advancing the lasting wipers comprises cam blocks 66 secured to spacer blocks 68 mounted on the frame member 24 and arranged to extend inwardly toward the center of the machine. Each of the pendants 34 carries a cam roll 70 which is constructed and arranged to ride against one of the cam blocks 66. Each roll 70 is pivotally mounted in a yoke in the head of a screw 72 (Fig. 2) which is freely mounted in a hole in one of the pendants 34 and is splined in a hollow boss 74 projecting outwardly from the pendant. The screw 72 is adjustable endwise thereof relatively to the pendant in order to adjust the position of the wipers widthwise of the shoe and is secured in adjusted position by lock nuts 76. Each cam block 66 has a rise 78 (Fig. 7) which causes the wipers to be advanced into the welt crease prior to the stretching and shaping of the upper over the last, and at its lower portion each cam block 66 has another rise 80 which causes the wipers to be further advanced to carry the welted margin of the upper under the insole. Between the rises 78 and 80 each cam block has a flat surface 82 which holds the wipers in a constant state of advancement while the upper is stretched and shaped over the last, and below the rise 80 each cam block has another flat surface 84 which holds the wipers in a constant state of advancement after the lasting has been completed and during further downward movement of the lasted shoe, if any, preliminary to the sole-attaching operation.

For operating the toe-lasting wipers 37 to last the welted margin at the toe end of the upper to the insole on the last bottom the illustrated machine is provided with a lever 85 (Figs. 1 and 3) which operates a plunger 87 through link and lever connections 89 and 91. The plunger 87 is slidably mounted in a hollow boss 93 (Fig. 3) and is arranged adjacent to the overlapping ends of the toe wipers. The operation of the lever 85 brings the plunger into engagement with the wipers and closes the wipers about the toe end of the upper and lasts the welted margin to the insole. To prevent rearward misplacement of the wiper carriers by the operation of the toe-lasting wipers 37, as above described, two stop members 95 (Figs. 1 and 5) are secured to the machine table 22 and arranged to engage respectively the two wiper carriers 32 at their corners nearest the rear part of the supported shoe.

For supporting an insole and a last in upright position during the lasting operation the illustrated machine is provided with a vertical sliding plate 86 (Fig. 1) which is mounted in a suitable opening in the machine table and is movable through said opening first to position the last support in operative relation to the lasting wipers, and after the lasting has been completed, to withdraw the last support downwardly into a recess in the machine table to provide clearance for the advancement of the sole-attaching device under the lasted shoe. For sliding the plate 86 through the machine table a gear segment 88 is pivoted on a bracket 90 projecting downwardly from the machine table and is provided with an operating hand lever 92 which projects outwardly and upwardly into a position convenient for the operator. The gear segment 88 meshes with rack teeth 94 in the plate 86. A friction screw 96 engages the plate 86 and holds it in the position in which it is located by the operation of the hand lever 92. At the upper end of the sliding plate 86 there is pivoted a rocker member 98 (Fig. 12) which is yieldingly held in the position illustrated in said figure by springs 100 seated in sockets in the plate 86 and arranged to engage opposite ends of the rocker member. The rocker member has an upward extension 102 at one end to which there is removably secured a narrow plate 104. Mounted on the plate 104 is a plate 106 which carries two plates 108 and 110 (Fig. 5) having upwardly extending marginal flanges which are constructed and arranged to conform generally to the outline of the toe portion of a cork filler of the type commonly employed in the manufacture of prewelted shoes. This filler in the completed shoe occupies the space between the insole and the outsole enclosed by the adjacent edge faces of the welt and upper. The plate 108 is secured to the plate 106, while the plate 110 is pivoted to the plate 106 at 112 and has a swinging movement to afford an adjustment of the plates 108 and 110 for different sizes of fillers. The range of the adjustive movement of the plate 110 is determined by a pin-and-slot connection between the plate 110 and the plate 106. The plates 108 and 110 are yieldingly held toward each other by a tension spring 114 (Fig. 7). Thus it will be seen that the plates 108 and 110 are adjusted for different sizes of fillers by merely moving the filler forwardly thereof between the flanges of said plates. Preferably the filler is attached to an insole and the insole and filler are mounted as a unit on the plates 104, 106 and 108. It will be understood that the insole and filler unit are accurately positioned with relation to the bottom of the last in the machine by positioning the forepart of the filler on the plates 108 and 110 and centering the rear part of the insole with relation to the plate 104. As illustrated in Fig. 12, the formation of the insole and filler-supporting assembly is such that the upper surfaces of the plates 108 and 110 are in alinement with the upper surface of that portion of the plate 104 extending from the plates 108 and 110 to the rear end of the supported shoe. It will be understood that the filler-supporting surfaces of said plates together form a line corresponding to the profile of the bottom of the last against which the insole and filler unit is to be positioned. After the lasting operation has been completed the plate 86 is drawn downwardly into its position illustrated in Figs. 10 and 12 to position the filler and insole supporting assembly within a recess 118 in the machine table 22 to provide clearance for the advancement of the sole-laying device, now to be described, into the position initially occupied by the filler and insole supporting assembly.

Referring to Figs. 5 and 10, the illustrated sole-laying device comprises a shallow box 120 having secured to the upper edge faces of its walls 122 a resilient air-tight diaphragm 124, herein illustrated as a sheet of vulcanized rubber, which provides a support for a sole to be attached to the bottom of the lasted shoe in the machine. For locating the forepart of a sole, for example the sole 126 illustrated in Fig. 5, on the diaphragm 124, there is secured to the top face of the wall 122 a gage plate 128 having an edge face constructed and arranged to engage the edge face of the toe end of the sole 126, and secured to the upper surface of the plate 128 is a sole holddown plate 130 having a curved margin extending beyond the sole-engaging face of the gage plate 128 for engagement with the top margin of the toe end of the sole. For gaging the position of the heel portion of the sole 126 and holding it down against the diaphragm 124, a gage plate 132 is provided for engagement with the edge face of the heel end of the sole, and a holddown plate 134 corresponding to the toe holddown plate 130 is secured to the gage plate 132. This gage plate and holddown plate assembly are slidably mounted on the top face of the wall 122 of the box 120 and on the shank portion of a handle 136 projecting outwardly from the box 120. The gage plate has a tongue-and-groove connection with the top of the wall 122 arranged to direct the movement of said plates toward and from the heel end of the sole 126. The extent of this movement is determined by a headed screw 138 which extends through a slot 140 provided in the gage plate and into a tapped hole in the handle 136. For holding said plates against upward movement during the sole-laying operation, a pair of holddown members 142 are secured to a plate 144 projecting from the bottom of the box 120 and extend upwardly therferom and inwardly over the top of the holddown plate 134 (Fig. 1). For moving the gage plate and holddown plate assembly, a handle 146 (Fig. 4) is secured to the holddown plate and projects upwardly therefrom, and a pair of springs 148 (Fig. 5) hold the gage plate 132 against the edge face of the heel end of the sole 126. The box 120 is slidably mounted on plates or gibs 150 (Fig. 10) secured to the top of the table 22 for movement in the direction of the length of the sole 126 to and from its operative position, the box being provided with angular plates 152 which engage the gibs 150. For inflating the box 120 with a fluid pressure medium, for example compressed air, in order to lift the diaphragm and press the sole upwardly against the bottom of the lasted shoe in the machine, compressed air from a supply tank (not shown) is fed through a pipe 154 (Fig. 5) which extends upwardly through an opening in the machine table and is normally closed at its free end by a ball valve 156. The box 120 is provided with a tube 158 through which compressed air is conducted into the box, and this tube projects outwardly through the wall 122 of the box and is arranged to engage the ball 156 as the box is brought into position beneath the lasted shoe in the machine, thereby opening the valve and permitting the admission of compressed air into the box for lifting the diaphragm as above described. When the box is returned to its initial position a spring 160 which backs up the ball valve 156 closes the valve and holds it closed until the box is again advanced for a repetition of the sole-laying operation.

In order to prevent upward movement of the last through the rear portion of the upper during the sole-laying operation a last holddown member is provided. Referring to Fig. 11, the illustrated holddown member comprises a sliding shaft 162 having a rounded and reduced lower end 164 constructed and arranged to enter the thimble in the last, a sleeve 166 in which the shaft 162 is mounted, and a block 168 which receives a hollow threaded stud 170 projecting upwardly from the sleeves. The block 168 is mounted on a crosspin 172 extending between parallel arms 174 extending forwardly from the crosshead 36. The crosspin 172 extends through a hole 176 provided in the block 168, which hole is large enough to permit the holddown assembly to swing widthwise of the shoe to adjust the rounded end of the shaft 162 for different positions of last thimbles. The shaft 162 is yieldingly held at the limit of its upward movement through the sleeve 166 by a spring 178 mounted in the hollow stud 170 and engaging at its lower end a hook 180 projecting upwardly from the upper end of the shaft 162 and at its upper end a hook 182 secured in the block 168. An annular handle 169 is mounted on the shaft 162 to facilitate downward movement of the shaft, and a pawl 184 is mounted on the sleeve 166 for engagement with ratchet teeth provided in the shaft 162 for holding the shaft against return movement after it has been moved downwardly into operative position. In order to position the ratchet teeth in the shaft 162 for engagement by the pawl 184 the shaft 162 is held against turning movement within the sleeve by a pin 186 which extends outwardly from the shaft 162 into a longitudinal slot 188 provided in the sleeve 166. The holddown assembly is yieldingly held in its position illustrated in Fig. 11 by a spring 190 extending from the sleeve 166 to the frame. In this position the holddown assembly is swung away from its operating position to provide clearance for the positioning of the shoe for the lasting operation. The return of the holddown assembly to its inoperative position (Fig. 11) by the spring 190 brings the tail of the pawl 184 against an abutment, herein illustrated as a screw 191, disengaging the pawl from the ratchet, and permitting the return of the shaft 162 to its initial position.

In manufacturing shoes with the aid of the illustrated machine a prewelded upper, for example the upper 192 illustrated in Fig. 7, is loosely mounted on a bare last 194, and the last and upper arranged in upright position are located beneath the lasting wipers and move upwardly through the wiper assembly to arrange the upper and the last in the position illustrated in Fig. 7 wherein the bottom margins of the wipers are in engagement with the upper surface of the welt and the welted margin of the upper lies against the periphery of the last somewhat above the last bottom. While the operator manually holds the last and upper in this position he swings downwardly the handle 92 thereby bringing the last support into operative position, as illustrated in Fig. 7. The last support has mounted thereon an insole having a filler cemented thereto, for example the insole and filler assembly 196 illustrated in Fig. 7. Preferably the insole and filler assembly is mounted accurately on the supporting and positioning plates 104, 108 and 110 before the last and upper are introduced into the machine. After the last support carrying the insole and filler assembly has been brought to bear against the bottom face of the last the operator depresses the treadle 42 thereby moving the lasting wiper assembly downwardly. In the course of the downward movement of the wiper assembly the cam rolls 70 move inwardly over the rises 78 in the cam blocks 66 bringing the lasting wipers into the welt crease of the upper, as illustrated in Fig. 8. As the downward movement of the wiper assembly continues from that point the cam rolls move downwardly along the dwells 82 of the cam blocks 66 and the upper is stretched heightwise of the last. When the cam rolls arrive at the rises 80 of the cam blocks the lasting wipers are located just below the bottom of the insole, and as the cam rolls move inwardly over said rises the lasting wipers are further advanced to wipe the side portions and the heel portion of the welted margin in under the margin of the insole (Fig. 9). This final advancement of the lasting wipers widthwise of the shoe brings the adjacent edge faces of the welt and upper at the toe portion of the shoe into engagement with the flanges extending upwardly from the plates 108 and 110 which support the toe portion of the insole and filler assembly, while the adjacent edge faces of the welt and upper rearwardly of the toe portion of the upper engage the edge face of the filler. The operator now advances the lever 85 to advance the toe-lasting wipers 37 inwardly under the toe end of the insole to complete the lasting operation. The insole and filler assembly 196 is now held against the last bottom by the lasting wipers about the entire periphery of the shoe bottom and the shoe is ready to receive an outsole. In order to provide clearance for the advancement of the sole-laying device the last support is returned to its initial position illustrated in Fig. 10 by an upward movement of the handle 92 (Fig. 1). The last holddown member 162 is then brought into operative position, as shown in Fig. 12, and the sole-laying device, on which a sole has been positioned, is advanced into operative position as illustrated in Fig. 10. This position is determined by the engagement of the box 120 with a stud 155 (Fig. 5) projecting upwardly from the table 22. As said device comes into this position the valve 156 in the feed pipe 154 is opened and compressed air is forced into the box 120, lifting the diaphragm 124 and pressing the sole upwardly against the shoe bottom, as illustrated in Fig. 12. The lasting-wiper assembly, together with the last holddown, are held against upward movement while the sole is pressed against the shoe bottom by a pawl 198 (Fig. 3) mounted on the treadle 42 and arranged to engage a ratchet member 200 secured to the machine frame. It will be understood that the upper surface of the sole and the sole-attaching faces of the welt and of the filler are treated with cement before they are positioned in the machine. The pressure applied to the sole is sufficient to cause the cement to bond the sole to the welt and filler throughout the entire extent of the shoe bottom. Preferably the sole is stitched to the welt after the shoe is removed from the illustrated machine, but, if desired, the sole may be permanently and finally secured to the shoe bottom by cement. Various cements suitable for this purpose are commonly employed in the manufacture of shoes. The sole is held under pressure against the shoe bottom long enough for the cement to set, and thereafter the air feed pipe 154 is moved away from the box 120 through a slot 202 (Fig. 5) provided in the machine table for the feed pipe thereby disengaging the feed pipe from the air tube 158 in the box and permitting the diaphragm 124 to contract sufficiently to disengage it from the attached sole and permit the sole-laying assembly to be retracted to its initial position.

While the illustrated machine is herein illustrated and described as employed in the lasting of prewelted uppers to insole and filler units, it is to be understood that the machine is well adapted for use in practicing other methods of manufacturing prewelted shoes. For example, the welted margin of a prewelted upper may be lasted against a raised portion on the bottom of a last, said raised portion corresponding in shape and position to a filler on the last bottom. When this method is employed a filler and insole unit is inserted into the shoe through the interior of the shoe after the sole has been stitched to the welt and the last has been pulled. A last which may be employed in practicing this method is disclosed in United States Letters Patent No. 2,082,196, granted June 1, 1937, on an application filed in the name of Worthington.

While the machine in its present organization is not well adapted for use in the manufacture of shoes other than prewelted shoes it is to be understood that the invention is not limited in its utility to machines for use in the manufacture of prewelted shoes but is applicable to machines for use in the manufacture of other types of shoes, for example, McKay shoes. In operating on other types of shoes such as McKay shoes a machine embodying the present invention would be provided with lasting wipers which would operate in substantially the same manner as the toe-lasting wipers of lasting machines of the bed type such, for example, as the machine illustrated and described in United States Patent No. 1,018,477, granted February 27, 1912, on an application filed in the name of Matthias Brock, except that the shoe would be supported in upright position instead of inverted, as shown in said Brock patent.

Having thus described my invention, what I claim as new and desire to secure by Letters Patent of the United States is:

1. In a shoe machine, means for stretching and shaping an upper over a last in upright position by operative movement heightwise of the last, means for holding a last in the machine against movement heightwise thereof in the direction of the stretching action on the upper, and a member for supporting a sole and positioning it for attachment to the upper after the upper has been stretched and shaped over the last.

2. In a shoe machine, lasting means, means for holding a last in the machine against movement heightwise thereof in the direction of the stretching action on the upper, and a member for supporting a sole and positioning it for attachment to a lasted shoe in the machine, said last-holding means and said sole-supporting member each being movable from operative position to permit advancement of the other into operative position.

3. In a shoe machine, lasting means, a support for holding a last in upright position in the machine during the lasting operation, a member for supporting a sole and positioning it for attachment to a lasted shoe in the machine, said member being movable to and from operating position, and means for retracting the last support to permit the advancement of said sole-supporting member into the position initially occupied by the last support.

4. In a shoe machine, lasting means, a last support for holding a last in upright position against downward movement during the lasting operation, a machine table provided with an opening in which the last support is positioned for movement downwardly below the upper surface of the table, means for pressing a sole against the bottom of a lasted shoe in the machine, and means on the machine table for locating said sole-pressing means in an operating position, said sole-pressing means being movable from operating position to permit upward movement of the last support through the opening in the machine table into last-supporting position.

5. In a shoe machine, lasting means, a support for holding a last in upright position against downward movement during the lasting operation, a member operated by fluid pressure to press a sole against the bottom of a lasted shoe in the machine, a carrier on which the member is mounted, and means for moving the last support from its operating position to permit advancement of the carrier into a position beneath a lasted shoe in the machine.

6. In a shoe machine, lasting means, a support for holding a last in upright position against downward movement during the lasting operation, a member operated by fluid pressure for supporting a sole and pressing it against the bottom of a lasted shoe in the machine, a carrier on which the member is mounted, means for moving the last support from its operating position to permit advancement of the carrier into a position beneath a lasted shoe in the machine, a machine table on which said carrier is mounted, means on the machine table for locating the carrier in predetermined relation to the bottom of the shoe, and means on the carrier for positioning a sole in predetermined relation to the member.

7. In a sole laying machine, means for sustaining a lasted shoe in upright position against heightwise movement, a sole-laying pad initially located in a position remote from the shoe to receive a sole, said shoe-sustaining means and pad being constructed and arranged for relative movement in one direction to locate the pad beneath the shoe, and means for effecting relative movement in another direction between the shoe and pad to lay the sole upon the shoe bottom.

8. In a sole laying machine, means for sustaining a lasted shoe in upright position against heightwise movement, a sole-laying pad initially located in a position remote from the shoe to receive a sole, said shoe-sustaining means and pad being constructed and arranged for relative movement in a horizontal plane to locate the pad beneath the shoe, and means for effecting relative movement between the shoe and pad to lay the sole upon the shoe bottom.

9. In a sole laying machine, a support for holding a shoe in upright position, a sole-laying pad initially located in a remote position from the shoe to afford access to the surface of the pad, means on the pad for locating a sole relatively to the pad, said pad being constructed and arranged for movement into a predetermined position beneath the shoe to locate the sole in proper relation to the shoe bottom, and means for relatively moving the shoe and pad heightwise of the shoe to press the sole upon the shoe bottom.

10. In a sole laying machine, a support for holding a shoe in upright position, a sole-laying pad initially located in a remote position from the shoe to afford access to the surface of the pad, means on the pad for locating a sole relatively to the pad, said pad being constructed and arranged for movement into a predetermined position beneath the shoe to locate the sole in proper relation to the shoe bottom, and fluid-operated means for moving the pad heightwise of the shoe to press the sole upon the shoe bottom.

11. In a sole laying machine, a support for holding a shoe in upright position, a sole-laying member operated by inflation and without bodily movement to press a sole mounted thereon against the bottom of the shoe, and means on said member for locating a sole thereon, said shoe support and said sole-laying member being relatively movable to position the sole-laying member beneath the shoe.

12. In a sole laying machine, a support for holding a shoe in upright position, a sole-laying member operated by fluid pressure for supporting a sole and pressing it against the bottom of the shoe, and means on said member for locating a sole thereon, said shoe support and said sole-laying member being relatively movable to position the sole-laying member beneath the shoe in predetermined relation to the shoe bottom.

13. In a sole laying machine, a support for a shoe in upright position, a sole-laying member operated by fluid pressure for supporting a sole and pressing it against the bottom of the shoe, a holddown for preventing upward movement of the shoe during the sole laying operation, and gages on the sole-laying member for locating the sole in a predetermined position thereon, said shoe support and said sole-laying member being relatively movable to position the sole-laying member beneath the shoe support with a sole on the sole-laying member positioned in registration with the shoe bottom.

14. In a shoe machine, lasting means, means for holding a last in upright position against downward movement during the lasting operation comprising a support which includes a last-bottom-engaging member constructed and arranged for rocking movement to permit self-adjustment thereof to the general inclination of the last bottom lengthwise thereof, and means for moving said last support from its operating position to permit another device to be positioned beneath the bottom of a shoe in the machine.

15. In a prewelt shoe machine, lasting means, means for supporting a last in upright position against downward movement during the lasting operation, said last-supporting means comprising a last-engaging rocker member which is self-adjusting to the general inclination of the last bottom lengthwise thereof, a slide on which the rocker is mounted, said slide being movable generally heightwise of the shoe to provide clearance below the shoe bottom for the location of another operating device, means for holding said last support in operating position, and means for operating said slide.

16. In a prewelt shoe machine, side-lasting wipers constructed and arranged to engage the upper-attaching surface of the welt of a prewelted upper, carriers for the wipers, means for moving the carriers heightwise of a prewelted upper on a last in the machine toward the last bottom thereby to stretch and shape the upper over the last, means for holding the last against movement in the direction of said heightwise movement of the wipers, and means for automatically advancing the wipers into the welt crease of the upper during their heightwise movement.

17. In a prewelt shoe machine, side-lasting wipers constructed and arranged to engage the upper-attaching surface of the welt of a prewelted upper, carriers for the wipers, means for moving the carriers heightwise of a prewelted upper on a last in the machine toward the last bottom thereby to stretch and shape the upper over the last, means for holding the last against movement in the direction of said heightwise movement of the wipers, means for automatically advancing the wipers into the welt crease of the upper during their heightwise movement, and means operating automatically on the wipers after the upper has been stretched over the last to lay the welted margin against an insole on the last bottom.

18. In a prewelt shoe machine, side-lasting wipers constructed and arranged to engage the upper-attaching surface of the welt of a prewelted upper, wiper carriers constructed and arranged for movement both heightwise and widthwise of the upper, means for moving the carriers heightwise of the upper, means for automatically moving the carriers widthwise of the upper at an early stage in their heightwise movement thereby to advance the wipers into the welt crease, and means for automatically moving the carriers widthwise of the upper to last the welted margin to an insole on a last bottom.

19. In a shoe machine, side-lasting wipers, wiper carriers constructed and arranged for movement heightwise of a shoe in the machine and for movement widthwise of the shoe, means for moving the carriers heightwise of the shoe, and cam mechanism for directing and controlling such heightwise movement and for causing the wipers to move widthwise of the shoe during their heightwise movement.

20. In a lasting machine, lasting wipers, wiper carriers constructed and arranged for substantially rectilinear operating movement, and a member constructed and arranged to engage the bottom of a last in the machine thereby to hold the last against movement heightwise thereof while permitting movement of the last with the wipers in any direction other than heightwise thereof.

21. In a shoe machine, side-lasting wipers, wiper carriers constructed and arranged for movement heightwise of an upper on a last in the machine and for movement widthwise of the upper, and a member for holding the last against movement heightwise thereof while permitting movement of the last in any direction other than heightwise thereof.

22. In a shoe machine, side-lasting wipers, carriers therefor, means for moving the carriers heightwise of an upper on a last in the machine toward the last bottom, means for holding the last against movement heightwise thereof during the operation of the wipers, and means for automatically advancing the wipers into upper-engaging position during such heightwise movement.

23. In a prewelt shoe machine, side-lasting wipers, means for moving the wipers heightwise of a prewelted upper on a last toward the last bottom, means for holding the last against movement heightwise thereof during the operation of the wipers, means for automatically advancing the wipers into upper-engaging position during such heightwise movement, and means for automatically further advancing the lasted wipers to a predetermined extent to last the welted margin of the upper up to the edge face of a filler on the last bottom.

24. In a lasting machine, side-lasting wipers, wiper carriers constructed and arranged for movement heightwise of a shoe in the machine, and means for automatically moving the carriers generally widthwise of the shoe at predetermined intervals and to predetermined extents during their heightwise movement.

25. In a shoe machine, means for supporting a lasted shoe arranged in substantially upright position and holding it against upward movement, and a fluid-pressure-operated device for pressing a sole against the bottom of the shoe, said device being movable from a position in which it is out of alinement with the shoe heightwise thereof to an operative position beneath the shoe.

26. In a shoe machine, means for supporting a lasted shoe arranged in substantially upright position and holding it against upward movement, a fluid-pressure-operated device for pressing a sole against the bottom of the shoe, said device being movable from a position remote from the shoe to an operative position beneath the shoe, and means on said device for locating a sole in a predetermined position thereon such that the sole will register accurately with the bottom of the shoe in the machine when said device is in operative position.

27. In a shoe machine, means for supporting a lasted shoe arranged in substantially upright position and holding it against upward movement, a fluid-pressure-operated device for pressing a sole against the bottom of the shoe, said device being movable from a position remote from the shoe to an operative position beneath the shoe, means for conducting fluid under pressure to said device, a valve in said conducting means, and means on said device for opening said valve as said device is advanced into operative position.

28. In a shoe machine, means for supporting a lasted shoe in upright position and holding it against upward movement during the attachment of a sole thereto, a device for laying a sole against the bottom of the shoe comprising a fluid container the top of which is closed by a resilient diaphragm which is impervious to the passage of fluid, a feed pipe for fluid under pressure, a conductor in said device for conducting fluid from said feed pipe into said device, and a valve in the feed pipe constructed and arranged to be opened by the engagement of said fixture therewith, said shoe-supporting means and sole-laying means being relatively movable to arrange the sole-laying means beneath the supported shoe.

29. In a shoe machine, lasting wipers for completely lasting a shoe and for supporting the shoe after it is lasted during the attachment of a sole thereto, means for holding the rear part of a last in the shoe against heightwise displacement during the sole-laying operation, a sole-laying device operated by fluid under pressure and arranged for movement from a position remote from the shoe into position for laying a sole against the bottom of the shoe, and gage members on the sole-laying device for locating a sole in a predetermined position thereon.

30. In a lasting machine, lasting wipers constructed and arranged to last the sides and one end portion of an upper, carriers to which said wipers are secured, and a pair of lasting wipers for lasting the opposite end portion of the upper, said last-mentioned wipers being pivoted to the wiper carriers at opposite sides of a shoe in the machine.

31. In a lasting machine, a pair of lasting wipers constructed and arranged for rectilinear operating movement generally widthwise of a shoe in the machine, said wipers being constructed and arranged to last the rear part of the shoe, the shank portion and the forepart to a point slightly beyond the tip line of the shoe, and a pair of toe wiper plates constructed and arranged for swinging operating movement about axes adjacent to the opposite sides of the toe end of a shoe in the machine.

32. In a lasting machine, a pair of side-lasting wipers constructed and arranged for substantially rectilinear operating movement generally widthwise of a shoe in the machine, and a pair of end-lasting wipers constructed and arranged for substantially rectilinear operating movement generally widthwise of the shoe and for swinging operating movement about axes adjacent to opposite sides of an end portion of the shoe.

33. In a lasting machine, end-lasting wipers constructed and arranged for substantially rectilinear operating movement generally widthwise of a shoe in the machine and for swinging operating movement about axes adjacent to opposite sides of an end portion of the shoe.

34. In a lasting machine, a pair of side-lasting wipers, a pair of carriers to which the wipers are respectively secured, end-lasting wipers pivoted to the carriers at opposite sides of an end portion of a shoe in the machine, means for imparting to the carriers substantially rectilinear movement generally widthwise of the shoe, and means for swinging the end-lasting wipers in a direction to last the end portion of the upper.

35. In a lasting machine, a pair of lasting wipers for lasting the opposite sides and one end of a shoe in the machine, said wipers having free end portions which overlap adjacent to the longitudinal median line of one end portion of the shoe, a pair of end-lasting wipers having free ends which overlap adjacent to the longitudinal median line of the opposite end of the shoe, a pair of wiper carriers to which the first-mentioned wipers are secured and to which the last-mentioned wipers are pivoted at points adjacent to opposite sides of the shoe, and means for imparting to said carriers substantially rectilinear movement generally widthwise of the shoe.

36. In a lasting machine, a pair of lasting wipers for lasting the opposite sides and one end of a shoe in the machine, said wipers having free end portions which overlap adjacent to the longitudinal median line of one end portion of the shoe, a pair of end-lasting wipers having free ends which overlap adjacent to the longitudinal median line of the opposite end of the shoe, a pair of wiper carriers to which the first-mentioned wipers are secured and to which the last-mentioned wipers are pivoted at points adjacent to opposite sides of the shoe, means for imparting to said carriers substantially rectilinear movement generally widthwise of the shoe, and means for advancing said last-mentioned wipers to last said opposite end of the shoe.

37. In a shoe machine, lasting wipers, means for supporting an insole and holding it against the bottom of a last in an upper in the machine, and wiper-operating mechanism constructed and arranged to position the upper and the last to register accurately with the insole.

38. In a shoe machine, lasting wipers, a support for a last in upright position, means on the support for holding an insole and positioning it relatively to the last bottom without the aid of last-penetrating fastenings, and wiper-operating mechanism constructed and arranged to position the last with its bottom face in registration with the supported insole.

39. In a shoe machine, lasting wipers, a support for a last in upright position, means on said support for holding an insole and filler unit in predetermined relation to the lasting wiper assembly without the aid of last-penetrating fastenings, and wiper-operating mechanism constructed and arranged to position the last so that its bottom face registers accurately with the supported insole and filler unit.

JACOB S. KAMBORIAN.